United States Patent [19]

Tani

[11] 3,995,113

[45] Nov. 30, 1976

[54] TWO-WAY ACOUSTIC COMMUNICATION THROUGH THE EAR WITH ACOUSTIC AND ELECTRIC NOISE REDUCTION

[76] Inventor: Okie Tani, Koto 10-3, Miyoshi 3-chome, Koto, Tokyo, Japan

[22] Filed: July 7, 1975

[21] Appl. No.: 593,586

[52] U.S. Cl. ................................ 179/1 P; 179/102; 179/107 E; 179/182 R

[51] Int. Cl.$^{2}$ ....................... H04R 1/10; H04M 1/19

[58] Field of Search................. 179/102, 107 E, 1 P, 179/182 R, 1 VC

[56] References Cited

UNITED STATES PATENTS

| | | | |
|---|---|---|---|
| 1,455,818 | 5/1923 | Steinberger | 179/182 R |
| 2,390,794 | 12/1945 | Knight | 179/107 E |
| 2,535,063 | 12/1950 | Halstead | 179/102 |
| 2,819,340 | 1/1958 | Brody | 179/1 VC |
| 2,964,596 | 12/1960 | Christensen | 179/107 E |
| 3,189,690 | 6/1965 | Millett | 179/1 VC |
| 3,798,393 | 3/1974 | Gorike | 179/182 R |
| 3,819,860 | 6/1974 | Miller | 179/1 P |

*Primary Examiner*—George G. Stellar
*Attorney, Agent, or Firm*—Lawrence I. Field

[57] ABSTRACT

Acoustic communication permitting reception of acoustic signals by converting the transmitted electric signals into acoustic signals by means of an apparatus to be simply inserted in the ear hole of a person and simultaneously permitting transmission of the voice of said person by converting the same into electric signals by means of said apparatus when inserted in the ear hole. The apparatus includes means including a leak hole and means including a compensating hole in the main body of the apparatus, the two holes cooperating to cancel the effect of ambient sound, when the device is in use.

2 Claims, 7 Drawing Figures

TWO-WAY ACOUSTIC COMMUNICATION THROUGH THE EAR WITH ACOUSTIC AND ELECTRIC NOISE REDUCTION

This invention relates to a method and apparatus for acoustic communication, and more particularly to a method for acoustic communication permitting, by means of an apparatus to be simply inserted into the ear hole of a person, transmission of the voice of said person by converting acoustic signals into electric signals and the apparatus therefor, or a method permitting, by means of an apparatus for transmission, reception of acoustic signals by converting the transmitted electric signals into acoustic signals in said transmitting state.

There are various conventional transducing devices for converting the electric signals into acoustic signals and emitting the same into the circumferential space, such as speakers, headphones, earphones or telephone receivers of crystal or dynamic type. All these devices, though being originally designed for conversion of electric signals into acoustic signals, can also be utilized as a so-called microphone for converting the acoustic signals present in space into electric signals if the conversion efficiency is disregarded. This purpose of using such devices as a microphone can be achieved by effectively applying the acoustic pressure to the vibrating system in respective device, for example by speaking to such devices. It will however be necessary to hold such devices close to the mouth, and the earphones inserted in the ear hole are incapable of practically acceptable sensitivity and clarity as a microphone for the person using said earphones.

Also for converting spatial acoustic signals into electric signals there are known various conventional microphones such as crystal, dynamic, condenser, ribbon or carbon microphone. Though these microphones are originally designed for converting the spatial vibration generated by voice into electric signals, certain devices such as crystal or dynamic microphone are capable of converting the electric signals applied thereto into weak acoustic signals. However such microphones are not practically usable for the purpose of converting electric signals into acoustic signals because of structural limitation in size of the vibrating system therein. Even if such conversion is made possible, rather cumbersome operations of holding such microphones close to the mouth and the ear will be required at each transmission and reception of the signals. Further, the aforementioned so-called microphones for converting the vocal pressure into electric signals have to be supported by hand or by other suitable means in order to maintain such microphones close to the mouth. Such microphones, therefore, are inconvenient for use in case hands are not available or in other special, situations, and have to used in an unnatural or inconvenient manner when the means other than hands are to be utilized for supporting.

As described in the foregoing, the prior transmitting devices and receiving devices are designed exclusively for the transmission and reception respectively, and communication requires both transmitting device and receiving device.

The present invention has been achieved, in consideration of the above-explained status of the prior art, to resolve various drawbacks inherent to the conventional technology, and the object of the present invention is to provide a novel method of acoustic communication permitting, by means of an apparatus to be simply inserted in the ear hole of a person, transmission of the voice of said person by converting acoustic signals into electric signals and the apparatus therefor.

Another object of the present invention is to provide a novel ear-plug type transmitting-receiving apparatus which, by simply inserting into the ear hole of a person, permits reception of the acoustic signals by converting the transmitted electric signals into audible acoustic signals and simultaneously permits transmission of the voice of said person by converting the sonic pressure generated in the auditory canal by said voice into the corresponding electric signals, and also to provide a method of communication utilizing such apparatus.

Still another object of the present invention is to provide a novel ear-plug type transmitting-receiving apparatus which is capable, by means of a compact light-weight device to be inserted into the ear hole, of performing both transmission and reception, and is particularly adequate for use as a noiseless microphone and earphone.

The above-mentioned and other objects of the present invention can be achieved an ear-plug type transmitting-receiving device comprising a main body incorporating an electric-acoustic mutual transducing device and provided with fitting part adapted to be inserted into the auditory canal, a means for reducing the mechanical impedance of the vibrating system and a means for eliminating the noise resulting from said impedance reducing means.

By the present invention there is provided a method and apparatus for acoustic communication not by mouth but by ear, according to which it is made possible, by simply inserting an ear-plug type transmitting-receiving device into the ear hole, to receive the acoustic signals by converting the transmitted electric signals into the audible acoustic signals and simultaneously to transmit the voice by converting the sonal pressure generated in the auditory canal by said voice into the corresponding electric signals. Stated differently a compact light-weight device fitted in the ear hole is capable of performing both functions of transmission and reception. According to the present invention, therefore, communication can be achieved by a single device without the use of a separate microphone and it is made possible to provide an extremely convenient and practical transmitter-receiver, which allows conversation without the loss of clarity even in the use, for example, by firemen with gas-masks in the extinguishing operation, and also allows the use as noise free microphone in noisy and dangerous places such as construction or quarrying sites.

The apparatus of the present invention is applicable in various electronic appliances such as telephone or transceiver. Said apparatus, enabling the transmission and reception by simple insertion into the auditory canal, makes it unnecessary, for example when used in ordinary telephone, to hold the receiver with hand, and allows therefore use of both hands for other works, thus improving the efficiency of business handling. Also in case of application in a transceiver it provides an advantage of eliminating the necessity of manual supporting. Further by the present invention underwater communication is also made possible.

The features of the present invention will become apparent from reading the following detailed description of the present invention in conjunction with the accompanying drawings, in which.

Figure 1:
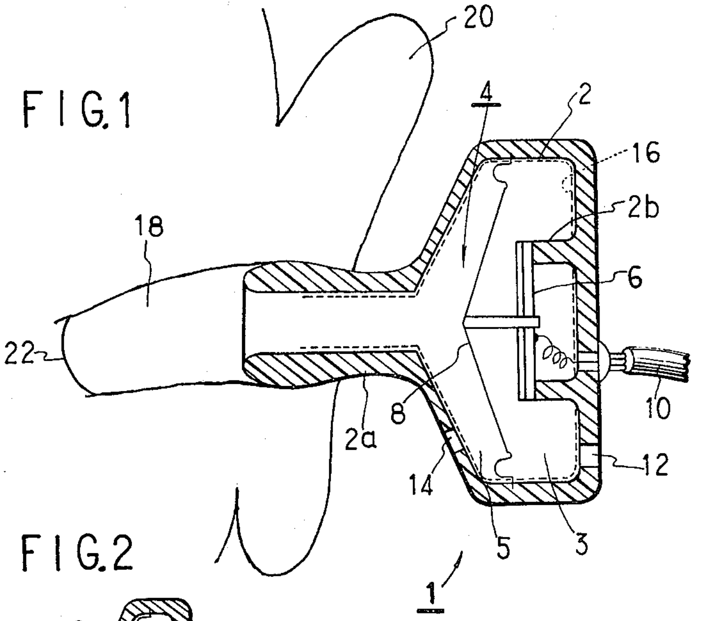
FIG. 1 is a cross sectional view showing a preferred embodiment of the ear-plug type transmitter-receiver of the present invention.

With reference to FIG. 1 showing a preferred embodiment of the ear-plug type transmitter-receiver of the present invention, 1 indicates the apparatus according to the present invention of which main body 2 incorporates an electric-acoustic mutual converting device 4 and of which extremity is provided with a fitting part 2*a* adapted to be inserted in the auditory canal 18. Said converting device 4 in the present embodiment is composed of a combination of a bimorph or piezoelectric element 6 fixed on the projecting part 2*b* in said main body 2 and a vibrating plate 8 mounted in the enlarged portion of said main body 2. It is to be understood that said mutual converting device is not limited to this combination but can be of any other type such as crystal or condenser type elements. The piezoelectric element 6 is provided with lead wires 10 for transmitting signals. A leak hole 12, for reducing the mechanical impedance of the vibrating system thereby allowing improving the efficiency of vibration of said vibrating plate 8, is provided in a suitable place of the air chamber 3 which is located in said main body 2 behind said vibrating plate 8. Also a compensating hole 14 is provided in a suitable position in the air chamber 5 which is located in said main body 2 in front of said vibrating plate 8 as a means for compensating and eliminating circumferential noise resulting from the presence of the means for reducing the mechanical impedance of the vibrating system. As described above, the means for reducing the mechanical impedance of the vibrating system and the means for eliminating the noise resulting from the presence of said impedance reducing means in the present embodiment are respectively constituted by a leak hole 12 and a compensating hole 14, but said means are by no means limited to such embodiment but are subject to wide variations. For example the abovementioned purposes can be achieved by forming parts of said main body 2 in front of and behind said vibrating plate 8 with a flexible material, and it will be obvious that any other means or structures capable of reducing the mechanical impedance of the vibrating plate 8 to allow efficient vibration of said vibrating plate 8 are utilizable for this purpose. The internal wall of the main body 2 is provided with a shielding element 16, composed for example of a coating of electroconductive paint, as a means for avoiding troubles such as noise resulting from electromagnetic induction from outside or oscillation resulting from electrostatic induction. Said electroconductive paint as the shielding element 16 can be obviously replaced by a shielding with a metal mesh or a metal plate, and the position thereof is not limited to the interior of the main body 2. The effect of said shielding element 16 will be enhanced by connecting with the ground wire of the leads 10. In FIG. 1, 20 and 22 indicate helix and tympanic membrane respectively.

In the following described are the function of this invention and the basic consideration leading thereto.

In order to transmit the human voice by converting the same into electric signals or to enable the transmission and reception with a single device, it will be obvious that the location of such device with respect to human body is important. For efficient transmission an ideal location will be close to mouth where the sonic pressure is highest, and for efficient reception a location close to the ear will be preferable. It will be rather cumbersome and impractical, however, to move said single device to the mouth and to the ear at each transmission and reception respectively. It is therefore concluded that the only way to allow both transmission and reception is the utilization of ear or related locations.

The present inventor, having noted a fact that the tympanic membrane which controls the human auditory sense is connected with the larynx by way of the Eustachian tube, have succeeded to efficiently detect and amplify the minute variation of pressure in the auditory canal resulting from voice, and have reached the apparatus and method of this invention. As shown in FIG. 1, the fitting part 2*a* of the apparatus used in the method of this invention is fitted into the auditory canal of a person. The minute vibration resulting from the voice of said person and transmitted by way of tympanic membrane generates a sonic pressure in the totally enclosed air chamber 5 and gives a variation of pressure on the vibrating plate 8. This efficiency is in fact a little lowered by the presence of said compensating hole 14 in the air chamber 5.

Figure 2:
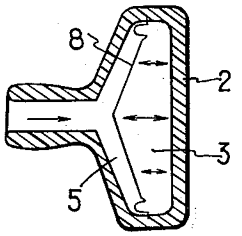
FIGS. 2 – 5 are schematic drawings explaining the present invention.
Figure 3:
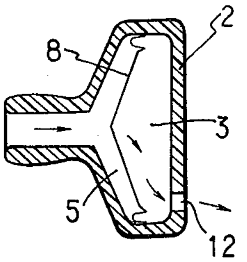
Figure 4:
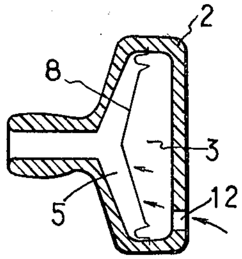

The function explained above can be discussed in comparison with a conventional earphone which is designed for converting electric signal into audible signals. Conventional earphone are practically not usable for the purpose of transmission because of low efficiency and lack of clarity, due principally to a fact that, as shown in FIG. 2, the totally enclosed structure behind the vibrating plate 8 gives rise to a high mechanical impedance of the vibrating system and restricts the vibration thereof when a sonic pressure applied from the auditory canal. The apparatus of the present invention has succeeded to detect, with a high efficiency, the minute sonic pressure present in the auditory canal by providing a leak hole 12 of a suitable diameter in consideration of the capacity of the air chamber 3, said hole being provided in a suitable position of main body 2 behind the vibrating plate 8 (refer to FIG. 3). On the other hand the presence of such leak hole, as shown in FIG. 4, will detect, in addition to the sonic pressure in the auditory canal, the circumferential noise which reaches the vibrating plate 8 through said lead hole 12, and the resulting vocal signals will be superposed with the noise signals.

Figure 5:
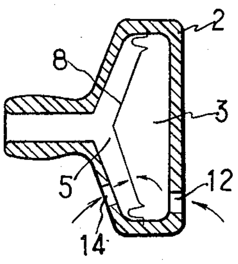
Figure 6:
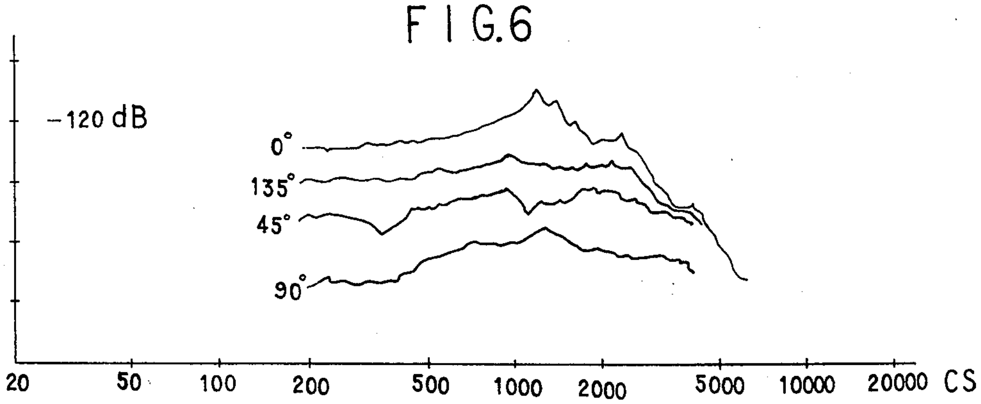
FIG. 6 is a drawing showing the differential effect characteristics of the apparatus according to the present invention.

In order to avoid this drawback the apparatus of the present invention is further provided with a compensating hole 14 on the said air chamber 5. In this structure the external sonic pressure is applied on both sides of the vibrating plate 8, and thus the external noise pressure is cancelled by the differential cancelling effect (refer to FIG. 5). Though the output due to the external sonic pressure is supposed to be reduced to zero in the ideal case, certain output from the external sonic pressure inevitably remains due to the difference of reflection coefficient and of phase in various wave lengths. It is nevertheless possible to obtain a satisfactory differential effect as shown in FIG. 6.

As the apparatus of the present invention shows a high impedance, a shield 16 composed for example of a coating of shield paint is provided as shown in FIG. 1 in order to prevent troubles such as oscillation.

Thus, when the user of the apparatus speaks, the sonic pressure is transmitted via the tympanic membrane 22 to the auditory canal 12, and the vibration of the vibrating plate 8 resulting from the sonic pressure in said auditory canal is converted by the piezoelectric element 6 into electric signals which are taken out by the leads 10. Said electric signals are used for transmission with or without amplification by a suitable amplifier, and it will be obvious that the conversion of mechanical vibration of the vibrating plate into the electric signals and the transmission thereof can be achieved by conventional means and processes.

Then, in case the apparatus and method of the present invention is to be used for reception, the function is quite similar to that of the conventional receiving mechanisms such as earphone. In this case the electric signals applied to the piezoelectric element 6 generates the vibration of the vibrating plate 8, which is efficiently transmitted to the tympanic membrane by the resonance in the air chamber 5 in the auditory canal and can be heard as acoustic signals.

Figure 7:
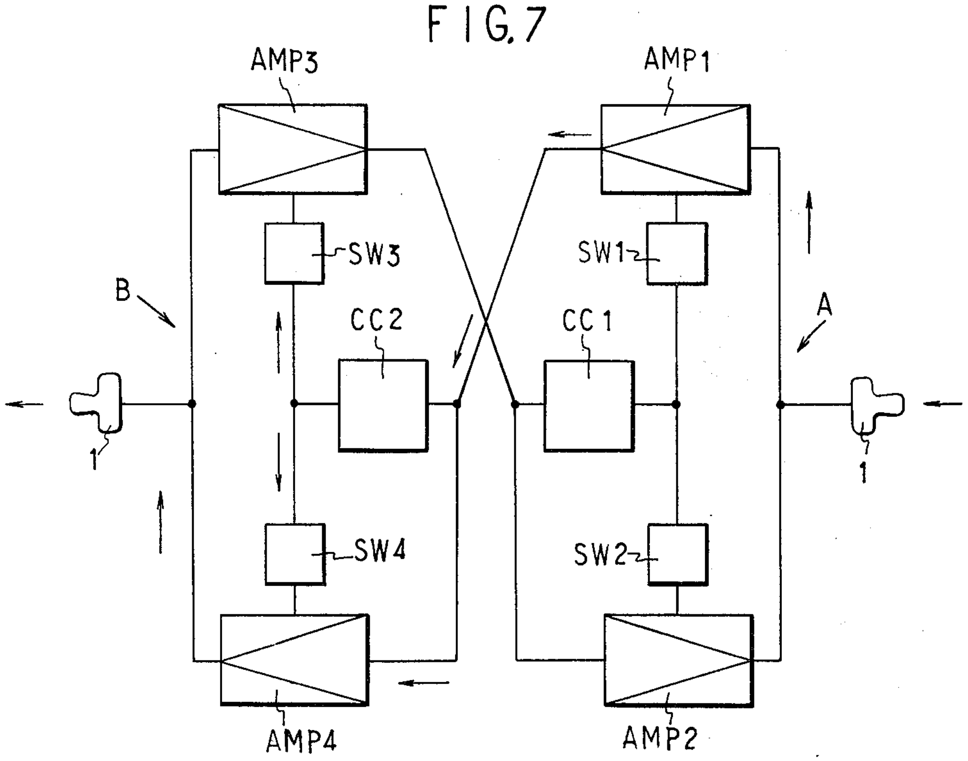
FIG. 7 is a schematic drawing showing an example of application of the apparatus according to the present invention.

With reference to FIG. 7 showing a block diagram of an example utilizing the apparatus of the present invention, the side A comprises an ear-plug type transmitter-receiver of the present invention, a transmitting amplifier AMP1, a receiving amplifier AMP2, a control circuit CC1 and switches SW1 and SW2, while the side B is similarly composed of an ear-plug type transmitter-receiver 1, a transmitting amplifier AMP3, a receiving amplifier AMP4, a control circuit CC2 and switches SW3 and SW4. In normal condition the amplifier AMP1 and AMP3, the control circuits CC1 and CC2, and the switches SW1 and SW3 are in operating condition whereas the amplifiers AMP2 and AMP4, and switches SW2 and SW4 are in non-operating condition. Consequently the ear-plug type transmitter-receivers 1 inserted into ear holes are not supplied with signals and thus remain silent.

Suppose that a vocal signal is emitted by the transmitter-receiver of the side A. This vocal signal is amplified by the amplifier AMP1, and the output thereof is applied to the control circuit CC2 of the side B. Said circuit CC2 is activated by said amplified vocal output and generates the control signals to the switches SW3 and SW4. As the result the amplifier which is in operating state in normal condition is changed to non-operating "off" state, and the amplifier AMP4 which is in non-operating state in normal condition is changed to operating "on" state. Consequently the vocal signal already amplified by the transmitting amplifier AMP1 of the side A is again amplified by the receiving amplifier AMP4 of the side B and transmitted to the ear-plug type transmitter-receiver 1 of the side B, which enables acoustic reception of the vocal signal emitted from the side A. When the vocal signal from the amplifier AMP1 terminates, the amplifier AMP4 and the switch SW4 which have been in operating state immediately return to the non-operating state, and simultaneously the amplifier AMP3, switch SW3 and control circuit CC2 which have been in non-operating state return to the operating state to recover the original normal condition. When a vocal signal is emitted by the ear-plug type transmitter-receiver 1 of the side B, the circuits of the side A perform similar function to enable the reception at the transmitter-receiver 1 of the side A of the vocal signal emitted by the side B.

While the invention has been described centering on the embodiments shown in the accompanying drawings, it will be understood that these embodiments are merely illustrative and not restrictive to the scope of the present invention. That is, the present invention can be embodied in many other forms with various changes and modifications without departing from the spirit and the scope of the invention and all of these changes and modifications are embraced within the scope of the claims that follow.

What is claimed is:

1. An ear-plug type transmitting-receiving apparatus capable of converting transmitted electric signals into acoustic signals for reception and also of converting the sonic pressure in the auditory canal of a person using said apparatus generated therein by the voice of said person into electric signals and transmitting the same, comprising:

a. a main body defining an air chamber and containing an acoustic-electric mutual converting device in said chamber;

b. a tubular fitting part on said body adapted for insertion into the auditory canal of the person using said apparatus and adapted to connect said air chamber to said auditory canal;

c. means including a leak hole provided in said main body for reducing the mechanical impedance of said converting device;

d. means including a compensating hole provided in said main body for eliminating noise resulting from the presence of said impedance reducing means by producing a differential cancelling effect to ambient sound at the converting device in cooperation with said leak hole; and e. an electrical shielding element in said main body to diminish noise and oscillation in said device.

2. Ear-plug type transmitting-receiving apparatuses according to the claim 1 respectively placed in mutually distant locations which comprises:

a. said respective ear-plug type transmitting-receiving apparatus being further provided with a transmitting amplifier which is in operating state in normal condition, and a receiving amplifier and a control circuit which are in non-operating state in normal condition;

b. a vocal signal emitted by either of said transmitting-receiving apparatuses actuating said control circuits of other apparatuses to cut off the transmitting amplifiers of said other apparatuses and to activate the receiving amplifiers of said other apparatuses by means of control signals emitted by said control circuits thereby rendering said other apparatuses available for reception to enable the transmission of said vocal signal; and c. all the components mentioned above being returned to the original normal state simultaneously with the termination of vocal signal.

* * * * *